US009088393B2

(12) United States Patent
Seok

(10) Patent No.: US 9,088,393 B2
(45) Date of Patent: Jul. 21, 2015

(54) METHOD AND APPARATUS FOR REPORTING CHANNEL STATE INFORMATION OF MULTI-CHANNEL IN WIRELESS LOCAL AREA NETWORK SYSTEM

(75) Inventor: Yong Ho Seok, Anyang-si (KR)

(73) Assignee: LG Electronics Inc., Seoul (KR)

(*) Notice: Subject to any disclaimer, the term of this patent is extended or adjusted under 35 U.S.C. 154(b) by 173 days.

(21) Appl. No.: 13/193,941

(22) Filed: Jul. 29, 2011

(65) Prior Publication Data
US 2012/0026909 A1 Feb. 2, 2012

Related U.S. Application Data

(60) Provisional application No. 61/369,084, filed on Jul. 30, 2010.

(51) Int. Cl.

| | |
|---|---|
| H04L 12/28 | (2006.01) |
| H04H 20/71 | (2008.01) |
| H04W 4/00 | (2009.01) |
| H04J 3/24 | (2006.01) |
| H04B 1/00 | (2006.01) |
| H04B 17/00 | (2006.01) |
| H04L 1/00 | (2006.01) |
| H04B 7/04 | (2006.01) |
| H04L 5/00 | (2006.01) |
| H04B 7/06 | (2006.01) |
| H04L 1/06 | (2006.01) |

(Continued)

(52) U.S. Cl.
CPC ............ *H04L 1/0031* (2013.01); *H04B 7/0417* (2013.01); *H04L 5/001* (2013.01); *H04B 7/0626* (2013.01); *H04B 7/0632* (2013.01); *H04L 1/0026* (2013.01); *H04L 1/0687* (2013.01); *H04L 5/0023* (2013.01); *H04W 16/28* (2013.01); *H04W 24/08* (2013.01); *H04W 28/06* (2013.01); *H04W 48/08* (2013.01)

(58) Field of Classification Search
CPC ........... H04L 1/31; H04L 1/26; H04L 1/0687; H04L 5/001; H04L 5/0023; H04B 7/0417; H04B 7/0626; H04B 7/0632; H04W 16/28; H04W 28/06
USPC ......... 370/252, 328, 208, 338, 254, 312, 349, 370/390; 455/186.1, 67.11, 69; 375/366, 375/365
See application file for complete search history.

(56) References Cited

U.S. PATENT DOCUMENTS 6,473,467 B1* 10/2002 Wallace et al. ............... 375/267
2007/0298742 A1* 12/2007 Ketchum et al. ........... 455/186.1

(Continued)

*Primary Examiner* — Alpus H Hsu
*Assistant Examiner* — Camquyen Thai
(74) *Attorney, Agent, or Firm* — Birch, Stewart, Kolasch & Birch, LLP

(57) ABSTRACT

A method for reporting channel state information (CSI), performed by a beamformee, in a wireless local area network system using multi-channels is provided. The method includes receiving, from a beamformer, an NDP announcement (NDPA) frame announcing that a null data packet (NDP) frame follows the NDPA frame, receiving the NDP frame from the beamformer, estimating a channel from a training symbol of the NDP frame and transmitting to the beamformer a CSI report frame containing a result obtained by estimating the channel, wherein the channel is a multi-channel acquired by aggregating first and second channels which are non-contiguous to each other, and wherein the CSI report frame includes an average signal to noise ratio (SNR) for each space-time stream of the first channel and a steering matrix for each subcarrier of the first channel and an average SNR for each space-time stream of the second channel and a steering matrix for each subcarrier of the second channel.

6 Claims, 9 Drawing Sheets

(51) Int. Cl.
*H04W 16/28* (2009.01)
*H04W 24/08* (2009.01)
*H04W 28/06* (2009.01)
*H04W 48/08* (2009.01)

(56) References Cited

U.S. PATENT DOCUMENTS

2008/0045153 A1* 2/2008 Surineni et al. .............. 455/63.1
2009/0129493 A1* 5/2009 Zhang et al. .................. 375/260
2010/0118856 A1* 5/2010 Krishnamurthy et al. .... 370/342
2010/0214169 A1* 8/2010 Kafle ............................ 342/368
2010/0248635 A1* 9/2010 Zhang et al. ................. 455/63.1
2011/0128947 A1* 6/2011 Liu et al. ....................... 370/338
2011/0194475 A1* 8/2011 Kim et al. ..................... 370/311
2011/0199968 A1* 8/2011 Kim et al. ..................... 370/328
2011/0273977 A1* 11/2011 Shapira et al. ................ 370/208
2011/0292919 A1* 12/2011 Trainin et al. ................. 370/338

* cited by examiner

FIG. 4

| Field | Size (bits) | Field |
|---|---|---|
| SNR in receive chain 1 | 8 | Signal-to-noise ration in the first receive chain of the STA sending the report |
| ... | | |
| SNR in receive chain Nr | 8 | Signal-to-noise ration in the Nr'th receive chain of the STA sending the report |
| CSI Matrix for carrier-28 | 3+2×Nb×Nc×Nr | CSI matrix |
| ... | | |
| CSI Matrix for carrier-1 | 3+2×Nb×Nc×Nr | CSI matrix |
| CSI Matrix for carrier 1 | 3+2×Nb×Nc×Nr | CSI matrix |
| ... | | |
| CSI Matrix for carrier 28 | 3+2×Nb×Nc×Nr | CSI matrix |

FIG. 5

| Field | Size (bits) | Field |
|---|---|---|
| SNR in receive chain 1 | 8 | Signal-to-noise ration in the first receive chain of the STA sending the report |
| ... | | |
| SNR in receive chain Nr | 8 | Signal-to-noise ration in the Nr'th receive chain of the STA sending the report |
| CSI Matrix for carrier-58 | 3+2×Nb×Nc×Nr | CSI matrix |
| ... | | |
| CSI Matrix for carrier-2 | 3+2×Nb×Nc×Nr | CSI matrix |
| CSI Matrix for carrier 2 | 3+2×Nb×Nc×Nr | CSI matrix |
| ... | | |
| CSI Matrix for carrier 58 | 3+2×Nb×Nc×Nr | CSI matrix |

FIG. 6

| Category | Action Value | Number of Channel | Operating Class | Channel Number | MIMO Control | CSI Report |
|---|---|---|---|---|---|---|
| 1 | 1 | 1 | 1 | 1 | 6 | variable |

These four fields are repeated, as determined by the number of channel field

Octets:

METHOD AND APPARATUS FOR REPORTING CHANNEL STATE INFORMATION OF MULTI-CHANNEL IN WIRELESS LOCAL AREA NETWORK SYSTEM

CROSS-REFERENCE TO RELATED APPLICATIONS

This application claims the benefit of priority of U.S. Provisional application No. 61/369,084 filed on Jul. 30, 2010 which are incorporated by reference in their entirety herein.

BACKGROUND OF THE INVENTION

1. Field of the Invention

The present invention relates to wireless communications, and more particularly, to a method and apparatus for reporting channel state information of multi-channel in a wireless local area network system.

2. Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Institute of electrical and electronics, engineers (IEEE) 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

To effectively utilize a radio channel, the next-generation WLAN system supports multi user-multiple input multiple output (MU-MIMO) transmission in which a plurality of non-access point (AP) stations (STAs) concurrently access to a channel. According to the MU-MIMO transmission, an AP can transmit frames concurrently to one or more MIMO-paired STAs.

The AP and the plurality of MU-MIMO paired STAs may have different capabilities. In this case, a supportable bandwidth, modulation coding scheme (MCS), forward error correction (FEC), etc., may vary depending on a STA type, usage, channel environment, etc.

The next-generation WLAN system shall support not only MU-MIMO but also data transmission using a wider bandwidth in order to achieve a higher throughput. However, it may be difficult to ensure a contiguous wide frequency bandwidth in a limited frequency band. To solve this problem, a method in which non-contiguous frequency bands are aggregated and used as one channel may be taken into account. Data transmission using a channel obtained by aggregating the non-contiguous frequency bands needs to support MU-MIMO transmission. Therefore, a procedure for acquiring/announcing channel state information for MU-MIMO transmission needs to be taken into account.

SUMMARY OF THE INVENTION

The present invention provides a method for reporting channel state information of multi-channel in a wireless local area network system and apparatus supporting the method.

In an aspect, a method for reporting channel state information (CSI), performed by a beamformee, in a wireless local area network system using multi-channels includes receiving, from a beamformer, an NDP announcement (NDPA) frame announcing that a null data packet (NDP) frame follows the NDPA frame, receiving the NDP frame from the beamformer, estimating a channel from a training symbol of the NDP frame and transmitting to the beamformer a CSI report frame containing a result obtained by estimating the channel, wherein the channel is a multi-channel acquired by aggregating first and second channels which are non-contiguous to each other, and wherein the CSI report frame includes an average signal to noise ratio (SNR) for each space-time stream of the first channel and a steering matrix for each subcarrier of the first channel and an average SNR for each space-time stream of the second channel and a steering matrix for each subcarrier of the second channel.

The method may further include being assigned an associaton identifier(AID) indentifying the beamformee by the beamformer, wherein the NDPA frame comprises the AID indicating the beamformee that recieves the NDP frame.

A bandwidth of the first channel may be 80 MHz and a bandwidth of the second channel may be 80 MHz.

The NDPA frame may include one or more station information fields indicating a destination station of the NDP frame, the NDPA frame may be broadcasted if the NDPA frame comprises a plurality of the station information fields, and the NDPA frame may be unicasted if the NDPA frame comprises one station information field.

In another aspect, an apparatus for reporting channel state information (CSI) in a wireless local area network system using multi-channels includes a processor configured to receive, from a beamformer, an NDP announcement (NDPA) frame announcing that a null data packet (NDP) frame follows the NDPA frame, receive the NDP frame from the beamformer, estimate a channel from a training symbol of the NDP frame and transmit to the beamformer a CSI report frame containing a result obtained by estimating the channel, wherein the channel is a multi-channel acquired by aggregating first and second channels which are non-contiguous to each other, and wherein the CSI report frame includes an average signal to noise ratio (SNR) for each space-time stream of the first channel and a steering matrix for each subcarrier of the first channel and an average SNR for each space-time stream of the second channel and a steering matrix for each subcarrier of the second channel.

BRIEF DESCRIPTION OF THE DRAWINGS

FIG. 4 and FIG. 5 show examples of a CSI Report field format.

FIG. 6 shows an extended CSI frame format according to an embodiment of the present invention.

DESCRIPTION OF EXEMPLARY EMBODIMENTS

Hereinafter, a method and apparatus for reporting channel state information of multi-channel in a wireless local area network system according to exemplary embodiments of the present invention will be described in detail with reference to the accompanying drawings. In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
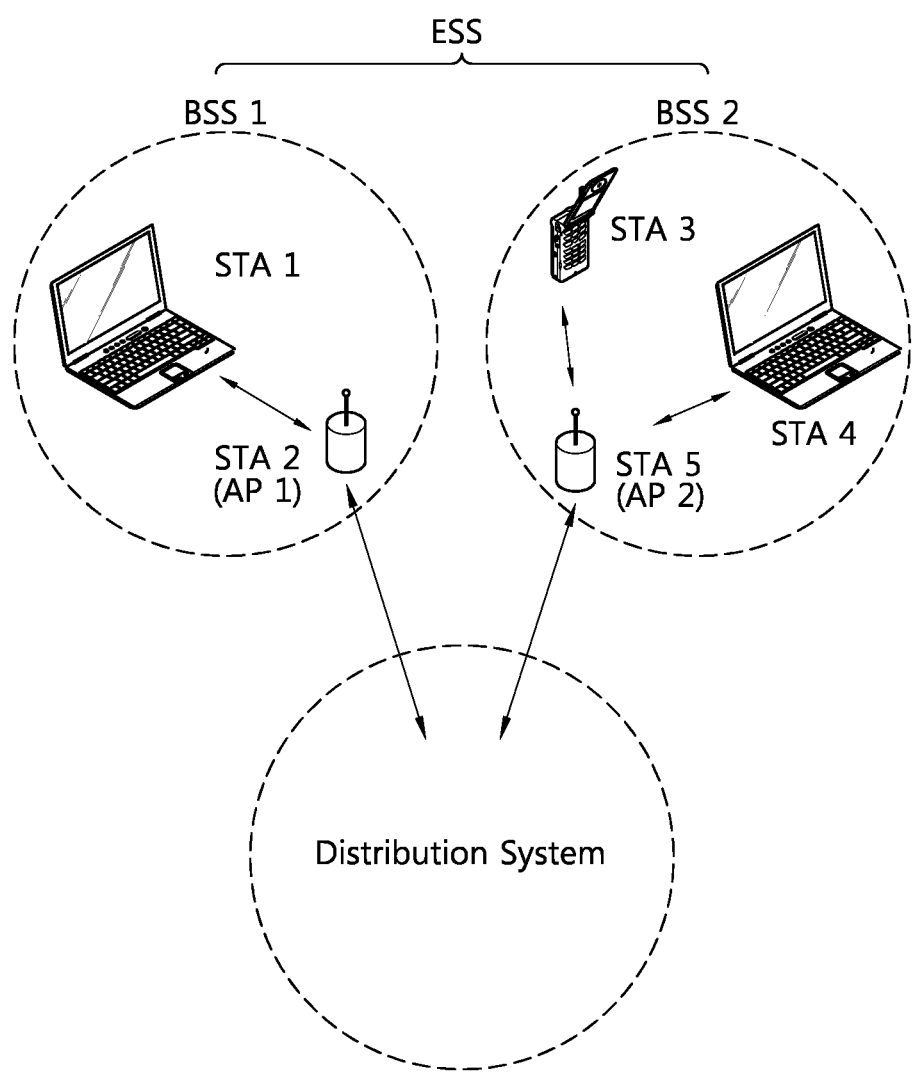
FIG. 1 schematically shows configurations of examples of a WLAN system to which the embodiments of the present invention can be applied.

FIG. 1 schematically shows configurations of examples of a WLAN system to which the embodiments of the present invention can be applied.

As shown in FIG. 1, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1. The infrastructure BSSs BSS1 and BSS2 include one or more Non-AP STAs STA1, STA2, STA3, and STA4, an access point (AP) which is a STA providing a distribution service, and a distribution system (DS) connecting plural APs AP1 and AP2.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, and STA4). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the BSS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 2:
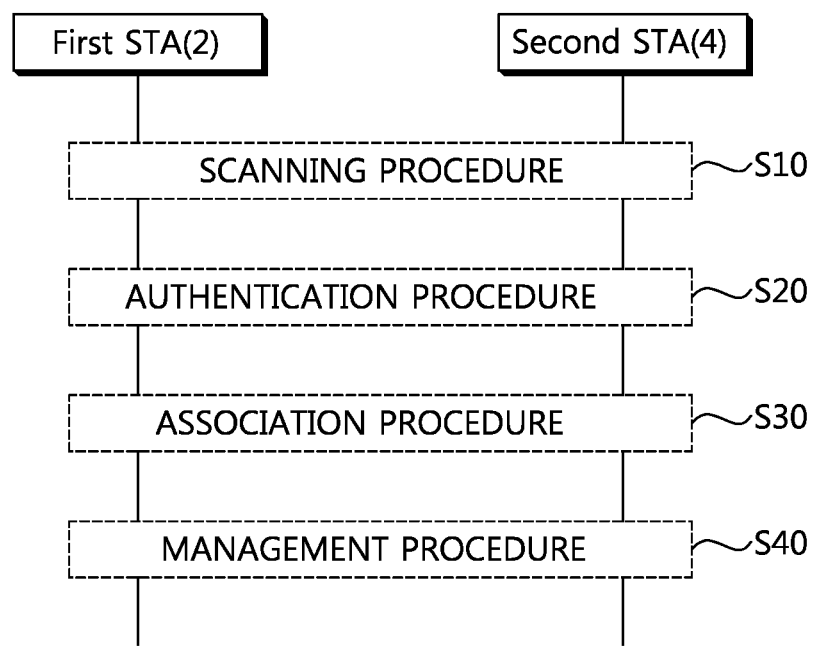
FIG. 2 is a flowchart illustrating a management procedure of a wireless network in a wireless LAN system.

FIG. 2 is a flowchart illustrating a management procedure of a wireless network in a wireless LAN system shown in FIG. 1 or in a wireless communication system including the wireless LAN system or equivalent thereto according to an embodiment of the invention. The flowchart of operations between the first STA 2 and the second STA 4 shown in FIG. 2 can show a procedure performed between a non-AP STA and an AP constituting an infrastructure BSS.

Referring to FIG. 2, a radio measurement procedure in a wireless communication system according to the embodiment of the invention further includes as preliminary procedures a scanning procedure (S10), an authentication procedure (S20), and an association procedure (S30). The radio measurement procedure further includes a management procedure (S40) which is performed after the preliminary procedures S10 to S30. According to the embodiment of the invention, some procedures of the preliminary procedures may not be essential but arbitrary.

Referring to FIG. 2, the scanning procedure S10 is first performed between the first STA 2, which is a non-AP STA and the second STA 4, which is an AP. The scanning procedure S10 is a procedure for allowing the non-AP STA 2 to search for a candidate station to be associated with in the association procedure S30, for example, a procedure for allowing a non-AP STA to search for an AP in the infrastructure BSS.

The scanning procedure can be classified into two types. One is a passive scanning method using a beacon frame transmitted from APs including the second STA 4. In this method, the Non-AP STA 2 to access a wireless LAN can search for an accessible BSS by receiving a beacon frame periodically transmitted from the second STA 4. The second STA 4 may include the Extended Capabilities element set to 1 in a transmitted beacon frame to indicate this support.

The other is an active scanning method. In this method, the first STA 2 to access a wireless LAN system first transmits a probe request frame. The STA 2 may include the Extended Capabilities element set to 1 in the probe request frame to indicate this support. The second STA 4 having received the probe request frame transmits a probe response frame including a service set ID (SSID) of the BSS managed by the AP and information on capabilities supported by the AP. And, the second STA 4 may also include the Extended Capabilities element set to 1 in the probe response frame to indicate this support. Accordingly, the first STA 2 can know existence of a candidate AP and a variety of information on the candidate AP from the received probe response frame.

Referring to FIG. 2, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 to be associated with one or more APs, which had searched for in the scanning procedure S10, In the WLAN, since an open system authentication method is used in most cases, the second STA 4 performs the authentication process without any condition in response to the authentication request from the first STA 2. Reinforced authentication methods include EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication process is successfully completed in the authentication procedure S20, the first STA 2 performs the association procedure S30. The association procedure S30 may be an arbitrary procedure which is performed when the first STA 2 is a non-AP STA and the second STA 4 is an AP. The association procedure S30 is to set up an identifiable link, that is, a wireless link, between the first STA 2 and the second STA 4. In the association procedure S30, the first STA 2 transmits an association request frame to the second STA 4 having successfully completed the authentication procedure S20. And the second STA 4 transmits to the first STA 2 an association response frame having a state value of "successful" in response to the association request frame. The association response frame includes an identifier for identifying the association with the first STA 2, for example, an association ID (AID).

When the association procedure S30 has been successfully completed but the connection state between the first STA 2 and the second STA 4 may be deteriorated due to a variable channel condition, the first STA 2 can perform the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs searched for in the scanning procedure S10) other than the AP currently associated therewith, and the different AP transmits a re-association response frame to the first STA 2. And, the re-association request frame further includes information on the AP previously associated therewith and the re-associated AP can transmit data buffered in the second STA 4, which is an existing AP, using the information.

Referring to FIG. 2, the management procedure (S40) is performed between the first STA 2 and the second STA 4 having completed the authentication procedure S20 and/or the association procedure S30 in addition thereto. In this embodiment, the first STA 2 and the second STA 4 perform a method for reporting channel state information of multichannel as a kind of management procedure shown in step S40.

The present invention relates to a method of acquiring/reporting channel state information (CSI) required to apply a MIMO technique to a multi-channel access mechanism in which non-contiguous channels are aggregated and used.

That is, the present invention proposes a method of acquiring/reporting the CSI between a beamformer and a beamformee which perform MIMO transmission. In downlink (DL) MU-MIMO transmission, the beamformer may be an AP, and the beamformee may be a plurality of non-AP STAs.

The beamformer transmits a sounding frame to the beamformee to acquire the CSI. When the sounding frame is transmitted by using a null data packet (NDP), the beamformer first sends a non-NDP frame and then transmits the NDP after a short interframe space (SIFS) elapses. The non-NDP frame is a frame which is transmitted to announce that the NDP will be transmitted subsequently. To announce the NDP transmission, an NDP announcement field value of a MAC header of the non-NDP frame may be set to 1. Alternatively, an NDP announcement (NDPA) frame may be transmitted to announce that the NDP will be transmitted.

Upon receiving the NDP, the beamformee transmits a CSI frame to the beamformer and thus can report the CSI to the beamformer.

Table 1 shows an example of a CSI frame format.

TABLE 1

| Order | Information |
|-------|-------------|
| 1 | Category |
| 2 | Action |
| 3 | MIMO Control |
| 4 | CSI Report |

A CSI frame may include Category, Action, MIMO Control, and CSI Report fields.

The Category field and the Action field indicate a category and function of the frame. That is, these fields may indicate that this frame is the CSI frame and is used to report the CSI to the beamformer.

The MIMO Control field may indicate Channel Width, Coefficient Size, and Sounding Timestamp values that constitute the CSI in association with the CSI Report field.

Figure 3:
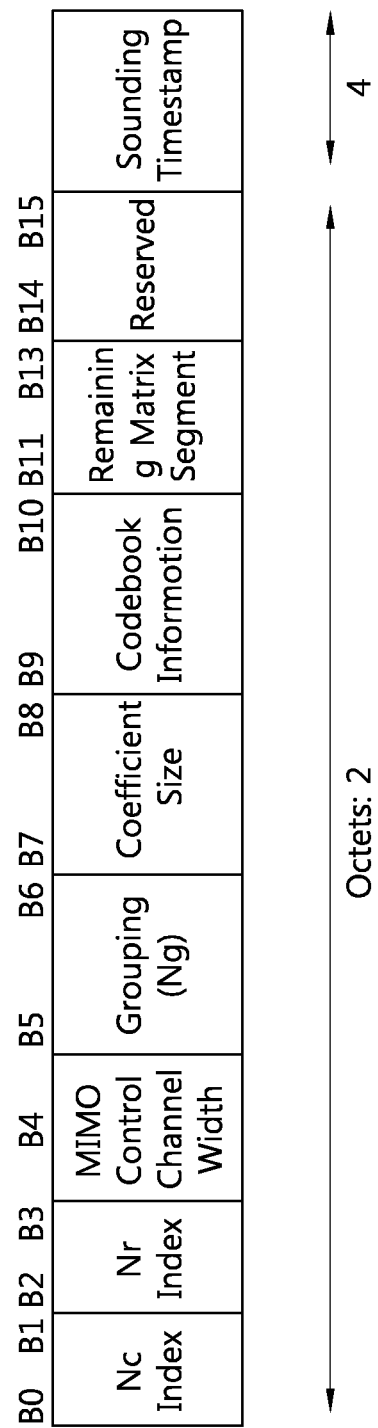
FIG. 3 shows an example of a MIMO Control field format.

FIG. 3 shows an example of a MIMO Control field format.

The subfields of the MIMO Control field may be defined in Table 2.

TABLE 2

| Subfield | Description |
|----------|-------------|
| Nc Index | Indicates the number of columns, Nc, in a matrix minus one:<br>Set to 0 for Nc = 1<br>Set to 1 for Nc = 2<br>. . .<br>Set to 7 for Nc = 8 |
| Nr Index | Indicates the number of rows, Nr, in a matrix minus one:<br>Set to 0 for Nr = 1<br>Set to 1 for Nr = 2<br>. . .<br>Set to 7 for Nr = 8 |
| MIMO Control Channel Width | Indicates the width of the channel in which a measurement was made:<br>Set to 0 for 20 MHz<br>Set to 1 for 40 MHz<br>Set to 2 for 80 MHz<br>Set to 3 for 160 MHz or 80 + 80 MHz |
| Grouping(Ng) | Number of carriers for grouping, Ng:<br>Set to 0 for Ng = 1 (No grouping)<br>Set to 1 for Ng = 2<br>Set to 2 for Ng = 4<br>The value 3 is reserved |

TABLE 2-continued

| Subfield | Description |
| --- | --- |
| Codebook Information | Indicates the size of codebook entries: |
| Remaining Matrix Segment | Indicate the remaining segment number for the associated VHT Compressed Beamforming frame. Set to 0 for the last segment of a segmented frame or the only segment of an unsegmented frame. In case of a retransmitted segment, the field is set to the same value associated with the segment in the original transmission. In case of a VHT Compressed Beamforming frame not carrying the Compressed Beamforming Report field, the field is set to all ones. |
| Sounding Timestamp | Sounding Timestamp or Sequence number from the NDPA soliciting feedback |

The MIMO Control field may further include a field indicating a feedback type. The feedback type field may have a length of 1 bit, and may indicate whether the CSI report is for SU-MIMO or MU-MIMO.

The CSI Report field is used by the CSI report frame to carry explicit feedback information in the form of angles representing compressed beamforming feedback matrices V for use by a transmit beamformer to determine steering matrices Q. The size of the CSI Report field depends on the values in the MIMO Control field. The CSI Report field contains the channel matrix elements indexed, first, by matrix angles in the order and, second, by data subcarrier index from lowest frequency to highest frequency. That is, the CSI Report field may be set to a value indicating an average signal to noise ratio (SNR) for each space-time stream and a CSI matrix for each subcarrier.

FIG. 4 and FIG. 5 show examples of a CSI Report field format. A CSI Report field format for a 20 MHz channel is shown in FIG. 4. A CSI Report field format for a 40 MHz channel is shown in FIG. 5.

When non-contiguous channels are aggregated and used, CSI differs for each channel. Thus, the CSI for respective channels constituting multi-channels needs to be known. An extended CSI frame format according to an embodiment of the present invention includes CSI reports for respective channels constituting multi-channels.

FIG. 6 shows an extended CSI frame format according to an embodiment of the present invention.

A number-of-channel field indicates the number of sub-channels for which CSI included in an extended CSI frame is provided.

If a beamformer uses only a contiguous channel, the number-of-channel field may be set to 1. If the beamformer uses two non-contiguous channels, the number-of-channel field may be set to 2.

The number of CSIs included in the CSI frame is equal to the number of channels corresponding to the value of the number-of-channel field. Operating Class/Channel Number/MIMO Control/CSI Report fields may be repeated by a value indicated by the number-of-channel field.

The Operating Class and Channel Number fields indicate frequency and bandwidth information on a corresponding channel.

A MIMO Control field may be set to a value indicating information elements which are described in Table 2 and which constitute the CSI with respect to the corresponding channel.

A CSI Report field indicates an average SNR for each space time stream and a CSI matrix for each subcarrier with respect to the corresponding channel.

A procedure for acquiring/reporting the CSI to support MIMO in the non-contiguous channel will be described below according to an embodiment of the present invention.

A beamformer transmits a sounding frame to a beamformee through a non-contiguous channel. In this case, the sounding frames may be transmitted in sequence for respective channels, or may be transmitted concurrently.

When an NDP is used as the sounding frame, the beamformer transmits a non-NDP frame to a receiving station (beamformee), and then transmits the NDP to the receiving station after an SIFS elapses. The non-NDP frame may be an NDPA frame which announces that an NDP frame will be transmitted subsequently and which indicates a beamformee for transmitting a CSI frame.

Upon receiving the NDP, the UE transmits CSI for each channel to a transmitting UE by using an extended CSI frame.

Figure 7:
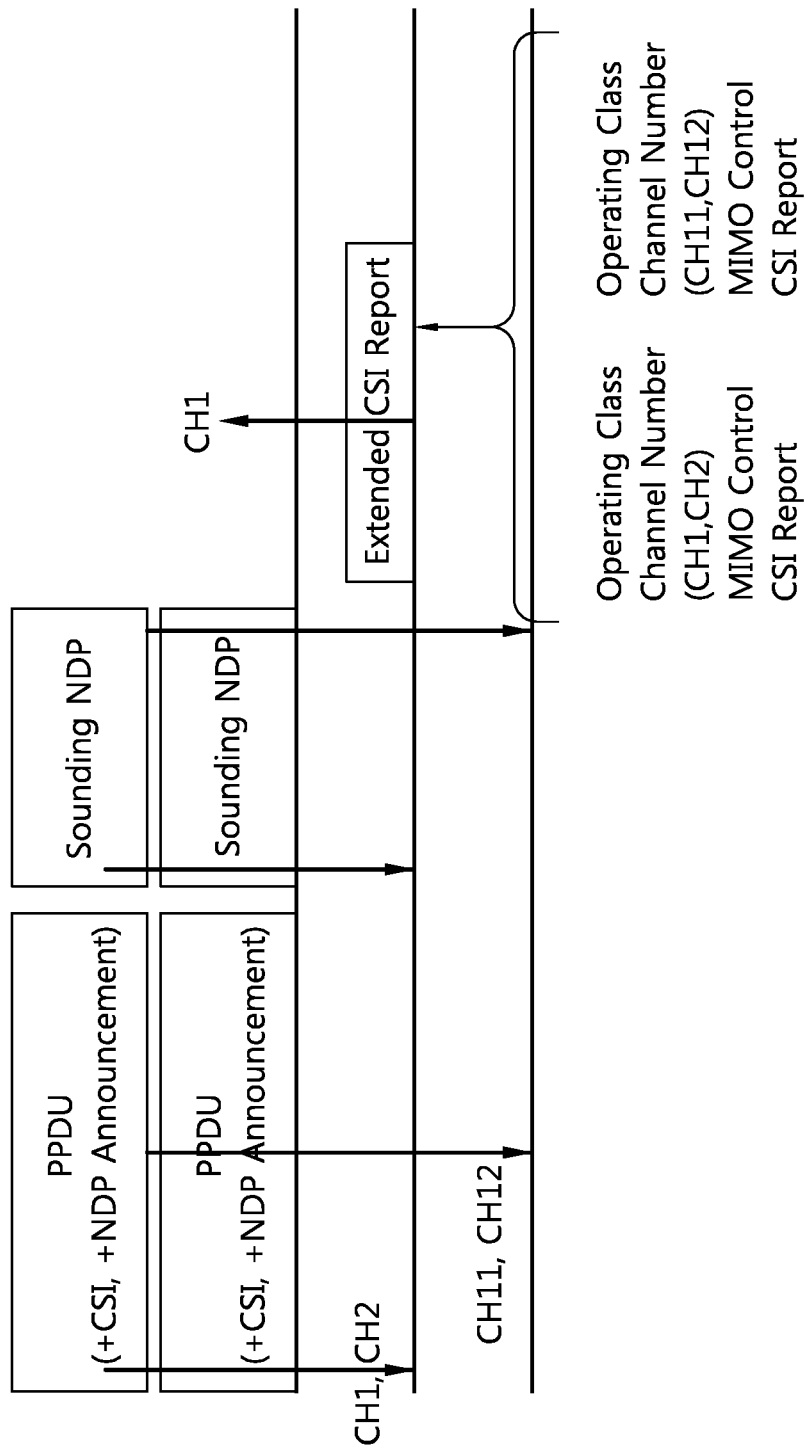
FIG. 7 shows an example of a multi-channel CSI report protocol.

FIG. 7 shows an example of a multi-channel CSI report protocol.

In the example of FIG. 7, a beamformer uses channels CH1 and CH2 by aggregating the channels as one contiguous 40 MHz channel, and uses channels CH11 and CH12 by aggregating the channels as another contiguous 40 MHz channel. The number of contiguous channels and a bandwidth of the contiguous channel may change variously according to an embodiment of the present invention. Multi-channels may consist of two or more non-contiguous channels. One contiguous channel may have various bandwidths, such as 20 MHz, 40 MHz, 60 MHz, or 80 MHz.

In this case, the beamformee performs channel measurement by using a training symbol of an NDP for each 40 MHz channel, and thus calculates a CSI value. Subsequently, an extended CSI frame including all CSIs for the respective channels is transmitted to the beamformer (i.e., AP).

For this, the extended CSI frame may include the aforementioned MIMO Control fields and the CSI Report fields for the respective channels. That is, the extended CSI frame includes CSI for respective channels constituting the multi-channels. In the example of FIG. 7, each channel bandwidth may be 80 MHz, and a plurality of beamformees may be provided. A multi-channel CSI report protocol for the plurality of beamformees will be described below with reference to FIG. 8.

Figure 8:
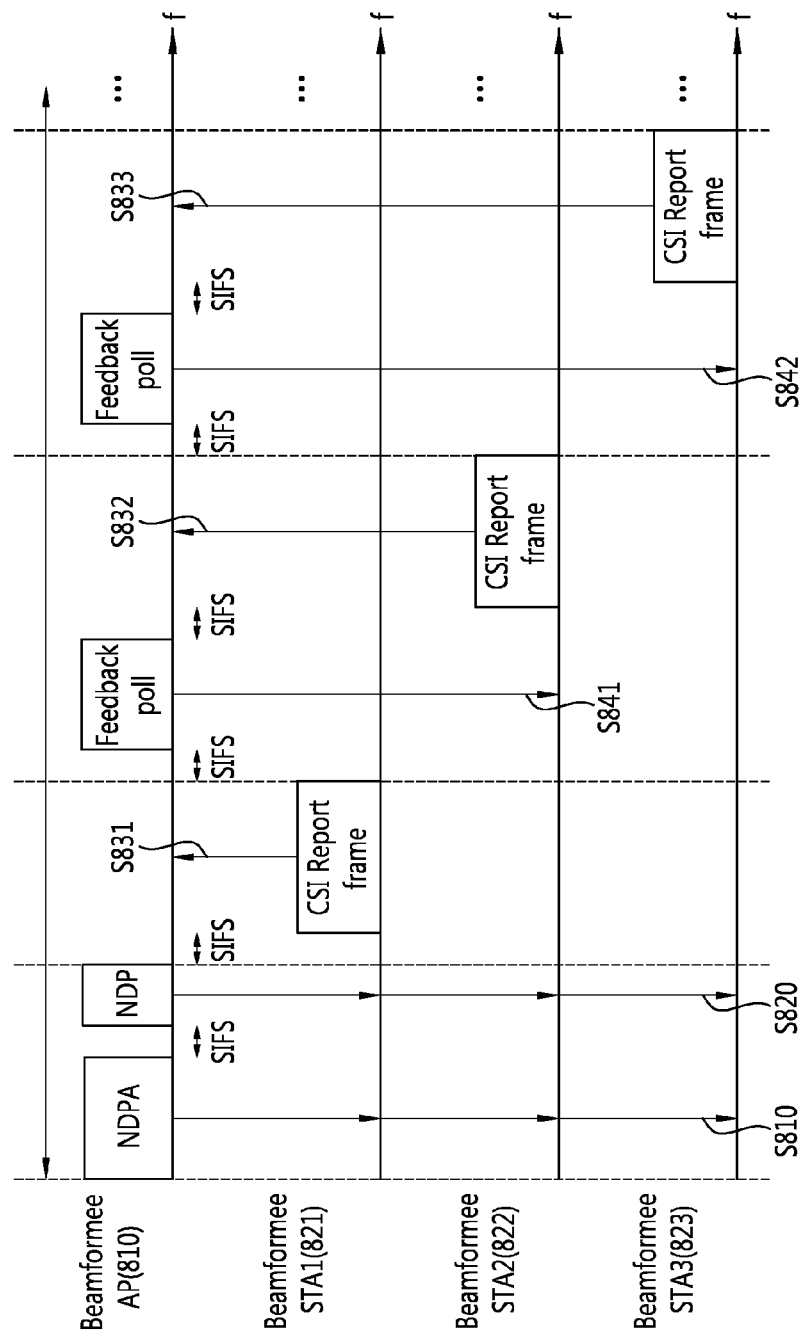
FIG. 8 shows a multi-channel CSI report protocol according to an embodiment of the present invention.

FIG. 8 shows a multi-channel CSI report protocol according to an embodiment of the present invention.

In the example of FIG. 8, a beamformer, i.e., an AP 810, performs sounding to transmit data to three beamformees, i.e., MU-MIMO paired STAs 821, 822, and 823. The AP 810 transmits an NDP announcement (NDPA) frame to the STA1 821, the STA2 822, and the STA3 823 (S810). The NDPA frame is used to announce information for identifying a STA to which a feedback frame will be transmitted in response to a subsequently transmitted NDP. The AP 810 transmits the NDPA frame by including a STA information field including information on a sounding target STA to the NDPA frame. The STA information field may be included for each sounding target STA. The NDPA frame may be referred to as a sounding announcement frame.

As shown in FIG. 8, the AP 810 broadcasts the NDPA frame if the NDPA frame is transmitted to at least one sounding target STA for MU-MIMO channel sounding. On the other hand, if the NDPA frame is intended to be transmitted to one sounding target STA for SU-MIMO channel sounding, recipient address information included in the NDPA frame may be transmitted in a unicast manner by configuring it as a MAC address of the sounding target STA.

Table 3 below shows an example of a STA information field format included in the NDPA frame.

TABLE 3

| subfield | Description |
| --- | --- |
| AID | Contains the AID of the STA expected to process the following NDP frame and prepare the sounding feedback. |
| Feedback Type | Indicates the type of feedback requested.<br>Set to 0 for SU.<br>Set to 1 for MU. |
| Nc Index | Indicates the feedback dimension requested if the Feedback Type field is set to 1:<br>Set to 0 to request Nc = 1<br>Set to 1 to request Nc = 2<br>...<br>Set to 7 to request Nc = 8<br>Reserved if the Feedback Type field is set to 0. |

In Table 3 above, Nc denotes the number of columns of beamforming feedback matrices among a plurality of pieces of feedback information transmitted by the sounding target STA to the AP in response to a received NDP.

Upon receiving the NDPA frame, STAs may confirm an AID sub-field value included in the STA information field, and may determine whether they are sounding target STAs. In the embodiment of the FIG. 8, the NDPA frame may include a STA information field including an AID of the STA1 821, a STA information field including an AID of the STA2 822, and a STA information field including an AID of the STA3 823.

The AP 810 transmits the NDP to the sounding target STA subsequent to transmission of the NDPA frame (S820). The NDP may have a format obtained by excluding a data field from a typical PPDU format. The NDP frame is subjected to beamforming by the AP 810, and is transmitted to the sounding target STA by using at least one spatial stream. Therefore, the sounding target STAs 821, 822, and 823 may estimate channels on the basis of a VHT-long training field (LTF) of the NDP.

As control information included in the NDP in NDP transmission, length information indicating a length of a physical layer convergence procedure (PLCP) service data unit (PSDU) included in the data field or a length of an aggregate-MAC protocol data unit (A-MPDU) included in the PSDU is set to 0, and information indicating the number of transmission target STAs is set to 1. A group ID indicating whether a transmission scheme used for NDP transmission is MU-MIMO or SU-MIMO and indicating a transmission target STA group is set to a value indicating SU-MIMO transmission. Information indicating the number of spatial streams allocated to the transmission target STA is set to a value corresponding to the number of spatial streams transmitted to the transmission target STA through MU-MIMO or SU-MIMO. Channel bandwidth information used for NDP transmission may be set to a bandwidth value used for transmission of the NDPA frame.

The STA1 821 transmits a CSI report frame to the AP 810 (S831). The channel bandwidth information used for transmission of the CSI report frame may be set to a value less than or equal to a channel bandwidth used for transmission of the NDPA frame. The CSI report frame includes CSI reports for respective channels constituting multi-channels used by the AP 810.

The AP 810 transmits a feedback poll frame to the STA2 822 after receiving the CSI report frame from the STA1 821 (S841). The feedback poll frame is a frame for requesting the receiving UE to transmit the CSI report frame. The feedback poll frame is transmitted in a unicast manner to a STA to which transmission of the CSI report frame will be requested. Upon receiving the feedback poll frame, the STA2 822 transmits the CSI report frame to the AP 810 (S832). Subsequently, the AP 810 transmits the feedback poll frame to the STA3 823 (S842). The STA3 823 transmits the CSI report frame to the AP 810 in response to the feedback poll frame (S833).

The AP 810 may acquire a steering matrix from the CSI report frame received from the STA1 821, the STA2 822, and the STA3 823, and may perform beamforming by using the acquired steering matrix to perform MU-MIMO transmission.

Figure 9:
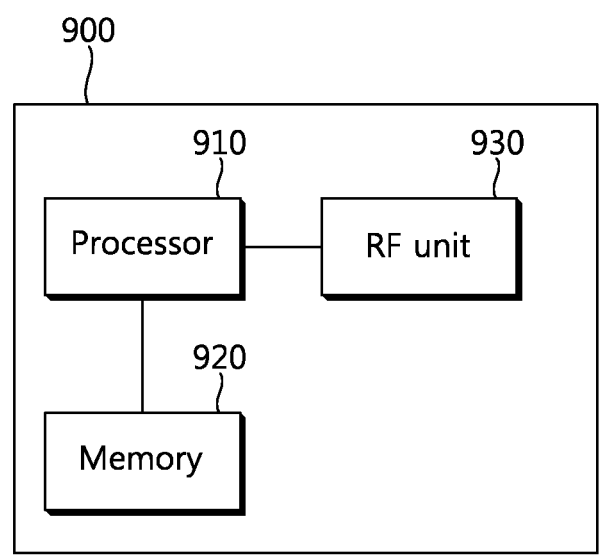
FIG. 9 is a schematic block diagram of a wireless apparatus according to an exemplary embodiment of the present invention.

FIG. 9 is a schematic block diagram of a wireless apparatus according to an exemplary embodiment of the present invention. A wireless apparatus 900 may be an AP station or a non-AP station.

The wireless apparatus 900 includes a processor 910, a memory 920, and an RF unit 930. The RF unit 930, transmitting and receiving a radio signal, implements a physical layer of IEEE 802.11 standard. The processor 910, functionally connected to the RF unit 930, implements a MAC layer and a physical layer of IEEE 802.11 standard. The processor 910 may generate the CSI report frame proposed by the present invention and transmit the CSI report frame to a counterpart STA via the RF unit 930 to implement the foregoing channel access, the control frame transmission/reception and data transmission method. The processor 910 and/or the RF unit 930 may include an ASIC (application-specific integrated circuit), a chip set, a logical circuit and/or a data processing device. The memory 920 may include a ROM (read-only memory), a RAM (random access memory), a flash memory, a memory card, a storage medium, and/or any other storage device. When the embodiments are implemented by software, the foregoing schemes may be implemented by modules (processes, functions, or the like) performing the foregoing functions. The modules can be stored in the memory 920 and executed by the processor 910. The memory 920 may be provided within or outside the processor 1310, or may be connected to the processor 910 by means of a well-known unit.

According to exemplary embodiments of the present invention, a method of acquiring channel state information by a beamformer from a beamformee is provided when non-contiguous channels are aggregated and used in order to acquire a channel having a wide frequency bandwidth. Therefore, MU-MIMO transmission can be effectively supported in a multi-channel environment.

The embodiments described above in detail are only examples explaining the technical spirit of the invention and it should be understood that the technical spirit is not limited to the embodiments. The scope of the invention is defined by the appended claims.

What is claimed is:

1. A method for reporting channel state information (CSI) in a wireless local area network system, the method comprising:

receiving, by a responding station, a null data packet (NDP) announcement frame to initiate a sounding feedback sequence from a requesting station, the NDP announcement frame including a receiver address field and a station information field, the station information field including an association identifier of the responding station expected to prepare a sounding feedback, wherein the station information field further includes a feedback type indicating whether the sounding feedback from a single station is requested or not, and wherein the receiver address field indicates an address of the responding station identified by the association identifier when the feedback type indicates that the sounding feedback from the single station is requested;

receiving, by the responding station, an NDP frame from the requesting station after receiving the NDP announcement frame, the NDP frame having at least one training field but no data field; and transmitting, by the responding station, a CSI report frame to the requesting station, the CSI report frame including CSI report information in a form of angles representing a beamforming feedback matrix that is estimated by the responding station based on the NDP frame, wherein, if the NDP frame is received via a plurality of contiguous channels, the beamforming feedback matrix is estimated based on all of the plurality of contiguous channels, and wherein, if the NDP frame is received via at least one of a plurality of non-contiguous channels, the beamforming feedback matrix is estimated based on only one of the plurality of non-contiguous channels.

2. The method of claim 1, wherein the receiver address field indicates a broadcast address when the feedback type indicates that the sounding feedback from the single station is not requested.

3. The method of claim 1, wherein the CSI report frame further includes a channel width field indicating the bandwidth of the transmission channel.

4. An apparatus configured to report channel state information (CSI) in a wireless local area network system, the apparatus comprising:
 a processor; and
 a memory operatively coupled with the processor and storing instructions that when executed by the processor causes to the apparatus to:
 receive a null data packet (NDP) announcement frame to initiate a sounding feedback sequence from a requesting station, the NDP announcement frame including a receiver address field and a station information field, the station information field including an association identifier of the apparatus expected to prepare a sounding feedback, wherein the station information field further includes a feedback type indicating whether the sounding feedback from a single station is requested or not, and wherein the receiver address field indicates an address of the apparatus identified by the association identifier when the feedback type indicates that the sounding feedback from the single station is requested; and receive an NDP frame from the requesting station after receiving the NDP announcement frame, the NDP frame having at least one training field but no data field; and transmit a CSI report frame to the requesting station, the CSI report frame including CSI report information in a form of angles representing a beamforming feedback matrix that is estimated based on the NDP frame, wherein, if the NDP frame is received via a plurality of contiguous channels, the beamforming feedback matrix is estimated based on all of the plurality of contiguous channels, and wherein, if the NDP frame is received via at least one of a plurality of non-contiguous channels, the beamforming feedback matrix is estimated based on only one of the plurality of non-contiguous channels.

5. The apparatus of claim 4, wherein the receiver address field indicates a broadcast address when the feedback type indicates that the sounding feedback from the single station is not requested.

6. The apparatus of claim 4, wherein the CSI report frame further includes a channel width field indicating the bandwidth of the transmission channel.

* * * * *